(12) United States Patent
Gopalakrishnan

(10) Patent No.: US 9,015,534 B2
(45) Date of Patent: Apr. 21, 2015

(54) GENERATION OF MEMORY DUMP OF A COMPUTER PROCESS WITHOUT TERMINATING THE COMPUTER PROCESS

(71) Applicant: Narendran Gopalakrishnan, Chennai (IN)

(72) Inventor: Narendran Gopalakrishnan, Chennai (IN)

(73) Assignee: Dell Products L.P., Round Rock, TX (US)

( * ) Notice: Subject to any disclaimer, the term of this patent is extended or adjusted under 35 U.S.C. 154(b) by 244 days.

(21) Appl. No.: 13/672,453

(22) Filed: Nov. 8, 2012

(65) Prior Publication Data
US 2014/0129880 A1 May 8, 2014

(51) Int. Cl.
*G06F 11/00* (2006.01)
*G06F 11/07* (2006.01)
*G06F 11/36* (2006.01)

(52) U.S. Cl.
CPC ........ *G06F 11/0778* (2013.01); *G06F 11/0715* (2013.01); *G06F 11/366* (2013.01)

(58) Field of Classification Search
CPC .............. G06F 11/0778; G06F 11/366; G06F 11/0715; G06F 11/1441; G06F 11/0706; G06F 11/0766; G06F 11/1417; G06F 11/3037; G06F 11/34; G06F 11/3636; G06F 9/524
USPC ....................................................... 714/38.11
See application file for complete search history.

(56) References Cited

U.S. PATENT DOCUMENTS

| 7,114,104 | B1 * | 9/2006 | Bennett ...................... 714/38.11 |
| 7,383,471 | B2 * | 6/2008 | Dall ........................... 714/38.11 |
| 2009/0327815 | A1 * | 12/2009 | Sridharan et al. ............... 714/38 |

OTHER PUBLICATIONS http://unix.stackexchange.com/questions/11185/dump-process-core-without-killing-the-process, Dump Process Core Without Killing the Process, 2 pages total, dated Apr. 12, 2011.
http://unix.stackexchange.com/tags/core-dump/hot, 2 pages total, dated Jun. 23, 2011.
http://stackoverflow.com/questions/131489/how-can-a-c-program-produce-a-core-dump-of-itself-without-terminating, 2 pages total, dated Sep. 25, 2008.

* cited by examiner

*Primary Examiner* — Bryce Bonzo
*Assistant Examiner* — Elmira Mehrmanesh
(74) *Attorney, Agent, or Firm* — Haynes and Boone, LLP

(57) ABSTRACT

In a computer system, a memory dump of a multi-threaded process can be created to contain information on all the threads without terminating the process, if the process uses user threads.

18 Claims, 10 Drawing Sheets

FIG. 5A PRIOR ART

```
/*
 * Copyright (c) 1995-1998 John Birrell <jb@cimlogic.com.au>
 * All rights reserved.
 *
 * Redistribution and use in source and binary forms, with or without
 * modification, are permitted provided that the following conditions
 * are met:
 * 1. Redistributions of source code must retain the above copyright
 *    notice, this list of conditions and the following disclaimer.
 * 2. Redistributions in binary form must reproduce the above copyright
 *    notice, this list of conditions and the following disclaimer in the
 *    documentation and/or other materials provided with the distribution.
 * 3. All advertising materials mentioning features or use of this software
 *    must display the following acknowledgement:
 *      This product includes software developed by John Birrell.
 * 4. Neither the name of the author nor the names of any co-contributors
 *    may be used to endorse or promote products derived from this software
 *    without specific prior written permission.
 *
 * THIS SOFTWARE IS PROVIDED BY JOHN BIRRELL AND CONTRIBUTORS ``AS IS'' AND
 * ANY EXPRESS OR IMPLIED WARRANTIES, INCLUDING, BUT NOT LIMITED TO, THE
 * IMPLIED WARRANTIES OF MERCHANTABILITY AND FITNESS FOR A PARTICULAR PURPOSE
 * ARE DISCLAIMED.  IN NO EVENT SHALL THE REGENTS OR CONTRIBUTORS BE LIABLE
 * FOR ANY DIRECT, INDIRECT, INCIDENTAL, SPECIAL, EXEMPLARY, OR CONSEQUENTIAL
 * DAMAGES (INCLUDING, BUT NOT LIMITED TO, PROCUREMENT OF SUBSTITUTE GOODS
 * OR SERVICES; LOSS OF USE, DATA, OR PROFITS; OR BUSINESS INTERRUPTION)
 * HOWEVER CAUSED AND ON ANY THEORY OF LIABILITY, WHETHER IN CONTRACT, STRICT
 * LIABILITY, OR TORT (INCLUDING NEGLIGENCE OR OTHERWISE) ARISING IN ANY WAY
 * OUT OF THE USE OF THIS SOFTWARE, EVEN IF ADVISED OF THE POSSIBILITY OF
 * SUCH DAMAGE.
 *
 */
```

FIG. 5B PRIOR ART

```
#include <errno.h>
#include <string.h>
#include <unistd.h>
#include <fcntl.h>
#ifdef _THREAD_SAFE
#include <pthread.h>
#include "pthread_private.h"

pid_t
fork(void)
{
    int         flags;
    pid_t       ret;
    pthread_t   pthread;
    pthread_t   pthread_next;

/* Lock the thread list: */
    _lock_thread_list();

/* Fork a new process: */
    if ((ret = _thread_sys_fork()) != 0) {
        /* Parent process or error. Nothing to do here. */
    } else {
```

FIG. 5C PRIOR ART

```
/* Close the pthread kernel pipe: */
_thread_sys_close(_thread_kern_pipe[0]);
_thread_sys_close(_thread_kern_pipe[1]);

/* Reset signals pending for the running thread: */
_thread_run->sigpend = 0;

/*
 * Create a pipe that is written to by the signal handler to
 * prevent signals being missed in calls to
 * _thread_sys_select:
 */
if (_thread_sys_pipe(_thread_kern_pipe) != 0) {
    /* Cannot create pipe, so abort: */
    PANIC("Cannot create pthread kernel pipe for forked process");
}
/* Get the flags for the read pipe: */
else if ((flags = _thread_sys_fcntl(_thread_kern_pipe[0], F_GETFL, NULL)) == -1) {
    /* Abort this application: */
    abort();
}
/* Make the read pipe non-blocking: */
else if (_thread_sys_fcntl(_thread_kern_pipe[0], F_SETFL, flags | O_NONBLOCK) == -1) {
    /* Abort this application: */
    abort();
}
```

FIG. 5D PRIOR ART

```
    /* Get the flags for the write pipe: */
    else if ((flags = _thread_sys_fcntl(_thread_kern_pipe[1], F_GETFL, NULL)) == -1) {
        /* Abort this application: */
        abort();
    }
    /* Make the write pipe non-blocking: */
    else if (_thread_sys_fcntl(_thread_kern_pipe[1], F_SETFL, flags | O_NONBLOCK) == -1) {
        /* Abort this application: */
        abort();
    } else {
        /* Point to the first thread in the list: */
        pthread = _thread_link_list;
        /*
         * Enter a loop to remove all threads other than
         * the running thread from the thread list:
         */
        while (pthread != NULL) {
            pthread_next = pthread->nxt;
            if (pthread == _thread_run) {
                _thread_link_list = pthread;
                pthread->nxt = NULL;
            } else {
```

FIG. 5E PRIOR ART

```
        if (pthread->attr.stackaddr_attr ==
            NULL && pthread->stack != NULL)
            /*
             * Free the stack of the
             * dead thread:
             */
            free(pthread->stack);

if (pthread->specific_data != NULL)
            free(pthread->specific_data);

free(pthread);
    }

/* Point to the next thread: */
    pthread = pthread_next;
            }
        }

/* Unock the thread list: */
    _unlock_thread_list();

/* Return the process ID: */
    return (ret);
}
#endif
```

GENERATION OF MEMORY DUMP OF A COMPUTER PROCESS WITHOUT TERMINATING THE COMPUTER PROCESS

BACKGROUND OF THE INVENTION

The present invention relates to computer systems, and more particularly to monitoring and debugging of computer systems.

A computer system is a complex machine, and problem diagnostics and other monitoring and debugging operations of such a system can be complicated. FIG. 1 illustrates an exemplary computer system 110 having one or more processors 120, a memory 130, and ports 140. Each processor 120 executes computer programs stored in memory 130. All or part of memory 130 and ports 140 may (or may not) be integrated with one or more processors 120 into a single chip. Ports 140 can be connected to external devices 142 such as network links, keyboards, computer monitors, printers, etc. The ports may be wired or wireless.

Each processor 120 includes registers 150 which store data used by a computer program executed by the processor. Registers 150 also store state information for the computer program. The state information may include, for example, the program counter which stores a memory 130 address of a memory location containing the instruction being executed or to be executed by the processor. The state information may include flags indicating whether the result of the most recent arithmetic instruction was positive, negative, or zero. Other information may also be stored in the registers.

Multiple computer programs can be executed in parallel. When a processor 120 switches from one computer program to another, the processor's registers 150 are saved in memory 130, and the other program's values are loaded into the registers.

Each computer program is represented as one or more processes 154 (FIG. 1 shows processes 154.1, 154.2, 154.S). Each process 154 is associated with resources identified by data stored in memory 130. In particular, data 154M describes the memory area 158 allocated for the process in memory 130. Data 154F identifies files (e.g. disk files) opened by the process. Data 154R identify the contents of registers 150: when a processor 120 interrupts execution of the process to execute another process, the processor's registers are stored as data 154R (in the process's stack in the corresponding area 158 for example); when the process execution is resumed by some processor 120, the data 154R are loaded into the processor's registers 150. Other resources may include locks used by the process to control access to other resources.

The processes are managed by the operating system, which itself is a computer program having one or more processes 154. In the example of FIG. 1, the process 154.S is an operating system process. Its memory area 158 includes process management module 156 with code and data for creating and terminating other processes 154, scheduling the other processes for execution on processors 120, maintaining process-related information including the process data 154M and 154F (which can be stored in module 156), and performing other process management tasks.

To monitor or debug the computer system, a computer developer may want to stop the computer system at any given time to examine the memory 130 and registers 150. However, in a production environment, the developer may want to monitor or debug the system 110 without stopping the system. Some computer systems allow the developer to get a snap shot of the memory area 138 occupied by any given process 154. For example, in some Unix-like operating systems, the developer may use a fork-and-kill method to generate a "core dump" file 160 for a process 154 without stopping the process.

Core dump 160 is a disk file created on a device 142, which may include a computer disk or some other storage. Core dump 160 contains the image of the memory area 158 and processor registers 150 for one process 154. The fork-and-kill method involves UNIX functions fork( ) and kill( ).

The fork( ) function, when called by any process 154, causes the operating system to create a new process ("child" process) identical to the calling process. FIG. 2 illustrates an example which initially included just two processes 154.1 and 154.2. Process 154.1 corresponds to memory area 158.1. The memory area of process 154.2 is not shown. Process 154.S includes memory management module 156 which implements the fork( ) and kill( ) functions as shown respectively at 180 and 190.

When process 154.1 calls fork( ) a child process 154.3 is created. Memory area 158.3 is allocated for the child process. Memory area 158.1 is copied to memory area 158.3, and is identical to memory area 158.1 except possibly as needed to update the memory references in the memory area. (The memory copying may be delayed under the "copy-on-write" paradigm, but will be performed when the core file 160 is created by the child process 154.3 as described below.)

The fork( ) implementation 180 also creates the data such as 154M, 154F, 154R for process 154.3 in suitable memory areas.

The fork( ) function can generally be used for many purposes unrelated to core dumps. For example, if computer system 110 is a network switch or router, then a new child process (such as 154.3) may be created by fork( ) for each incoming packet. The new process inherits the packet-processing code and data from the fork-calling process (such as 154.1), so only minimal initialization for the new process may be needed. When the new process finishes the packet processing, the new process may terminate using the exit( ) function call. The exit( ) function does not create a core dump.

In the example of FIG. 2, the child process 154.3 terminates with a kill( ) function call. This function, when executed by module 190, creates the core dump 160. The kill( ) function is called only by the child process 154.3, not by the parent process 154.1.

This fork-and-kill method is limited however when applied to multithreaded processes. A multithreaded process includes multiple threads 210 (FIG. 3) which compete for processors 120. Each thread 210 is associated with the same memory, files, and possibly other resources as the corresponding process 154, but each thread 210 has its own copy of processor registers 154R. The operating system's process and thread management module 156 schedules individual threads 210, not processes 154, for execution on processors 120. In FIG. 3, process 154.1 has two threads 210.1, 210.2. (The threads are managed by the operating system's process and thread management module 156.)

When a processor 120 is executing a thread 210 (say 210.1) and the thread calls fork( ) the operating system's fork( ) function 180 creates a new process, say 154.3, like in FIG. 2. However, only one thread 210 is created for the new process, which is a copy of the calling thread 210.1. The other threads are not replicated in order to simplify synchronization between the new process 154.3 and the threads of process 154.1. Therefore, when thread 210.1 of process 154.3 calls kill( ) in the fork-and-kill method, the core dump file 160 will contain the registers 154R for only the calling thread 210.1 of process 154.3 (which are the same or almost the same as the registers 154R of thread 210.1 of process 154.1). The registers 154R of the other threads of process 154.1 will be unavailable in the core dump.

SUMMARY

This section summarizes some features of the invention. Other features may be described in the subsequent sections. The invention is defined by the appended claims, which are incorporated into this section by reference.

Some embodiments of the present invention obtain a core dump with all the threads.

The invention is not limited to the features and advantages described above except as defined by the appended claims.

BRIEF DESCRIPTION OF THE DRAWINGS

Each of FIGS. 1, 2, 3 is a block diagram showing features of hardware and software architecture of multi-processing computer systems according to prior art.

Each of FIGS. 4A and 4B is a block diagram showing features of hardware and software architecture of multi-processing computer systems according to some embodiments of the present invention.

FIGS. 5A-5E illustrate programming code according to prior art which is used in some embodiments of the present invention.

DESCRIPTION OF SOME EMBODIMENTS

The embodiments described in this section illustrate but do not limit the invention. The invention is defined by the appended claims.

Figure 1:
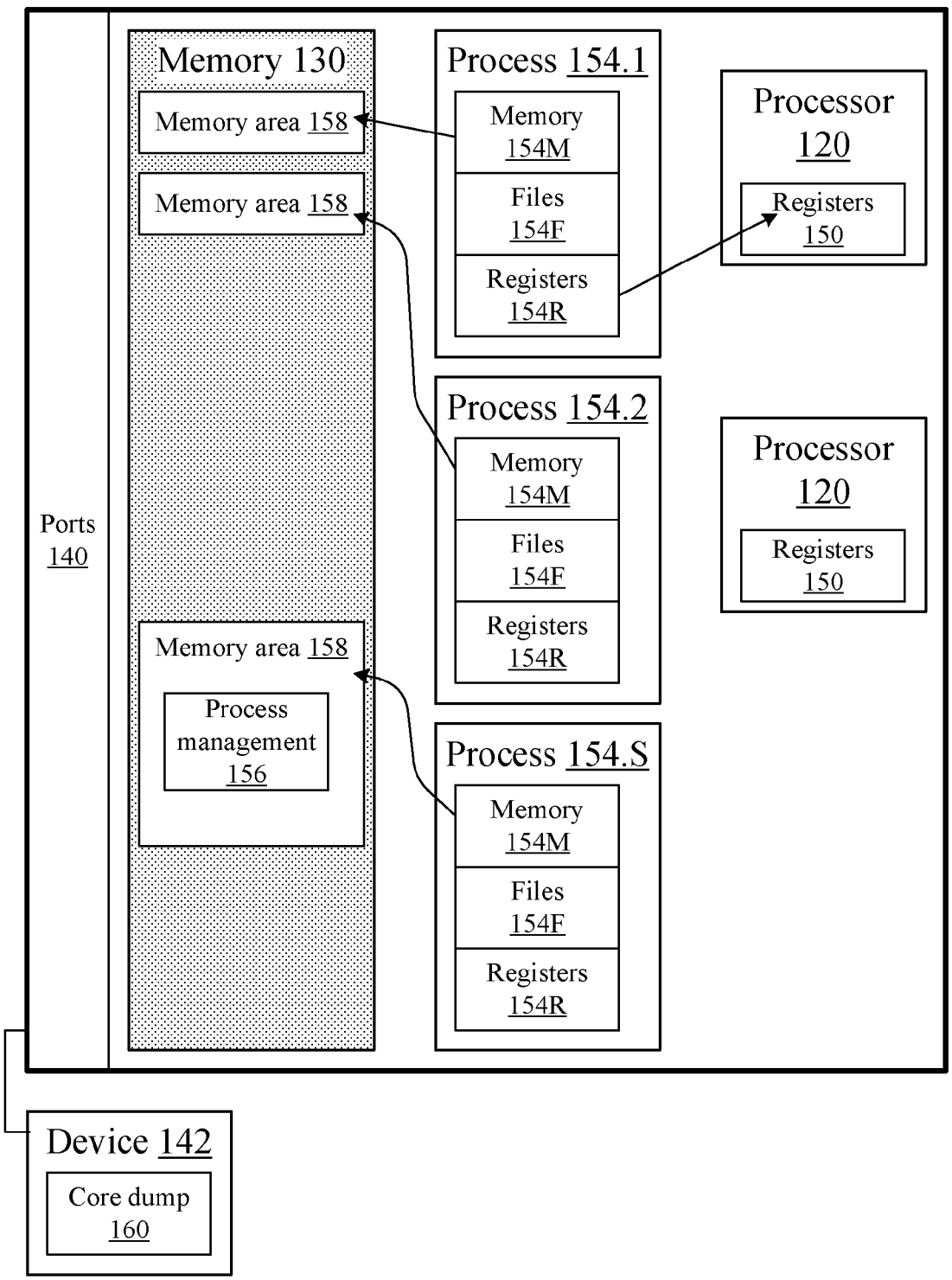
Figure 2:
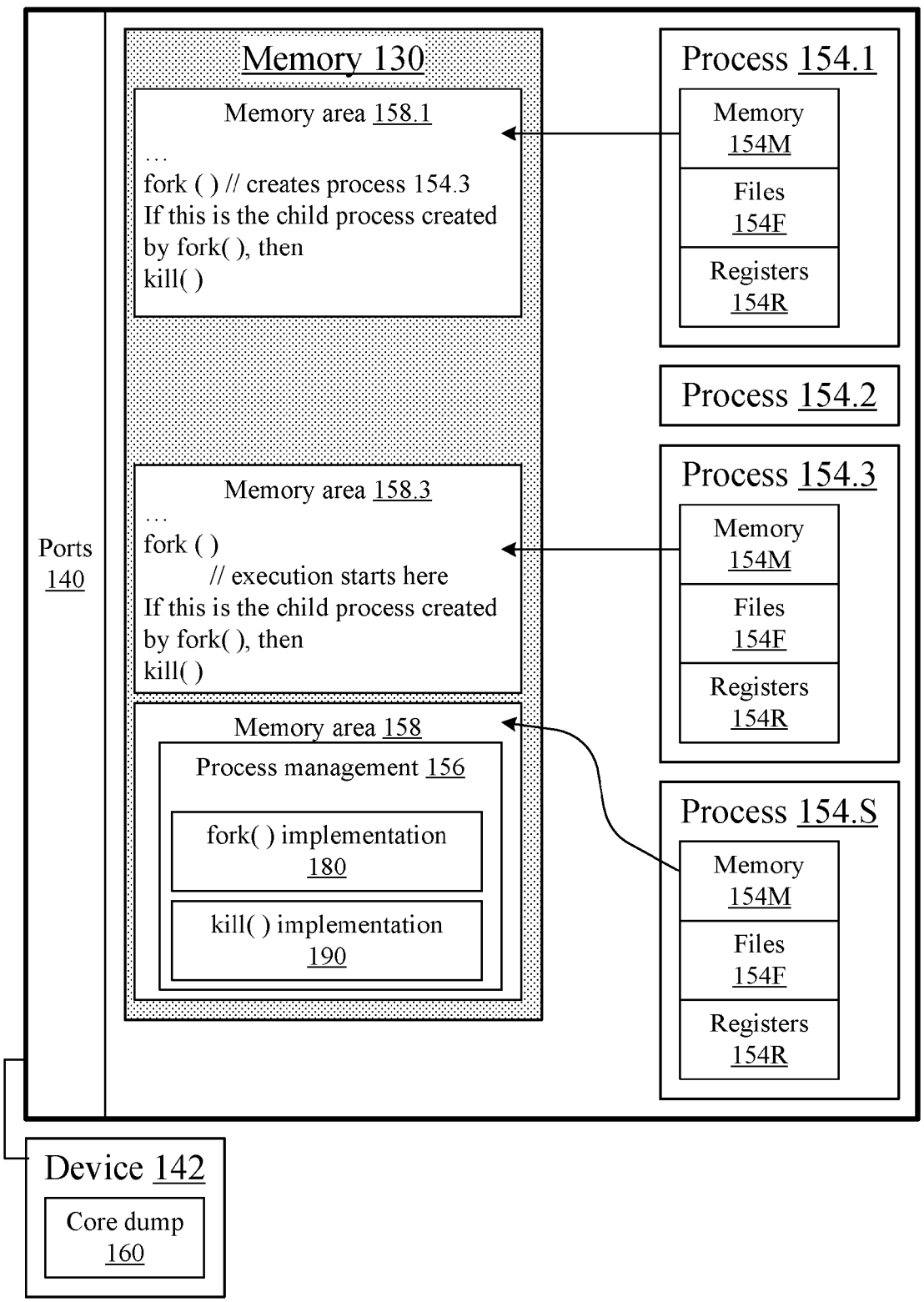
Figure 3:
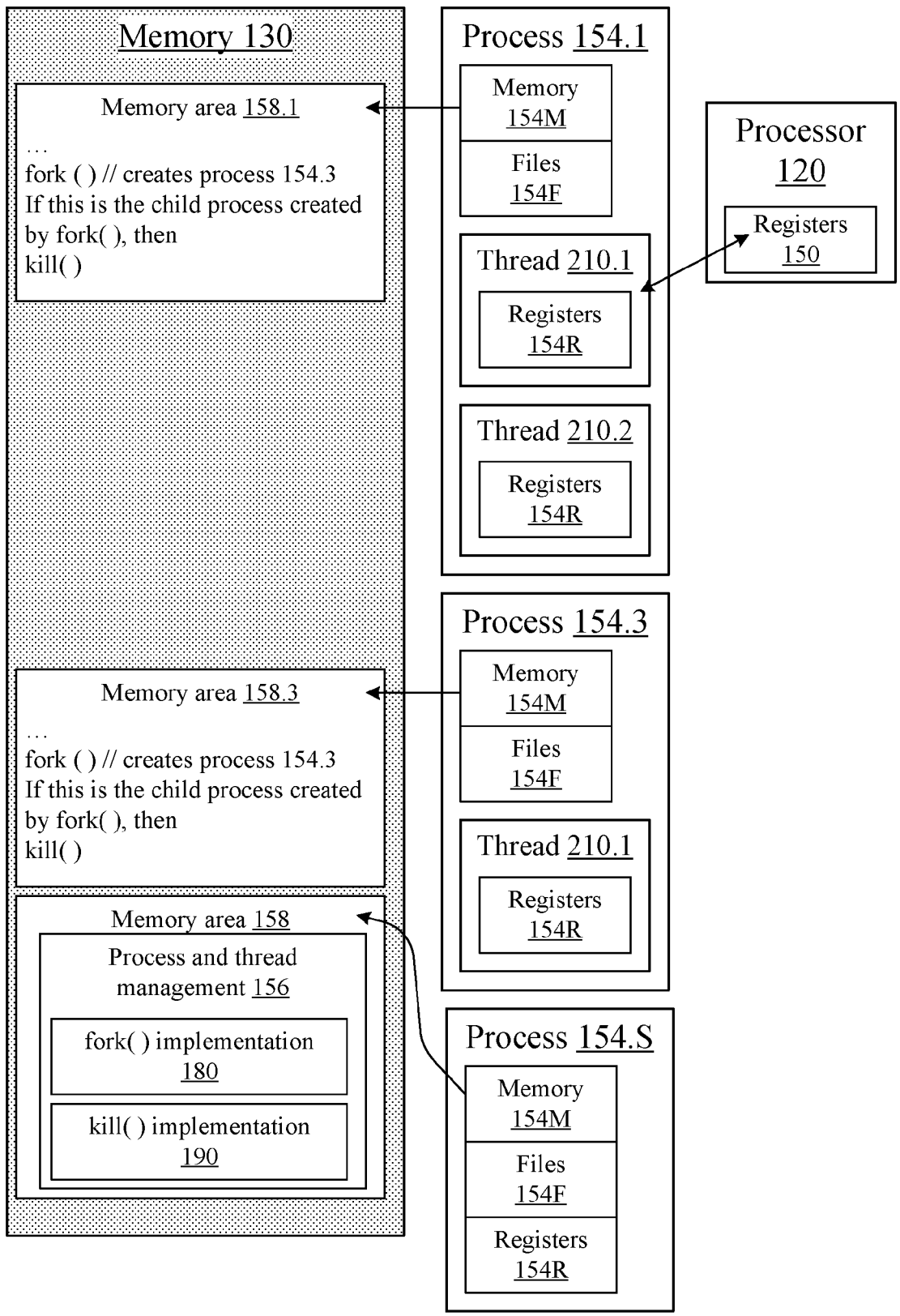
Figure 4A:
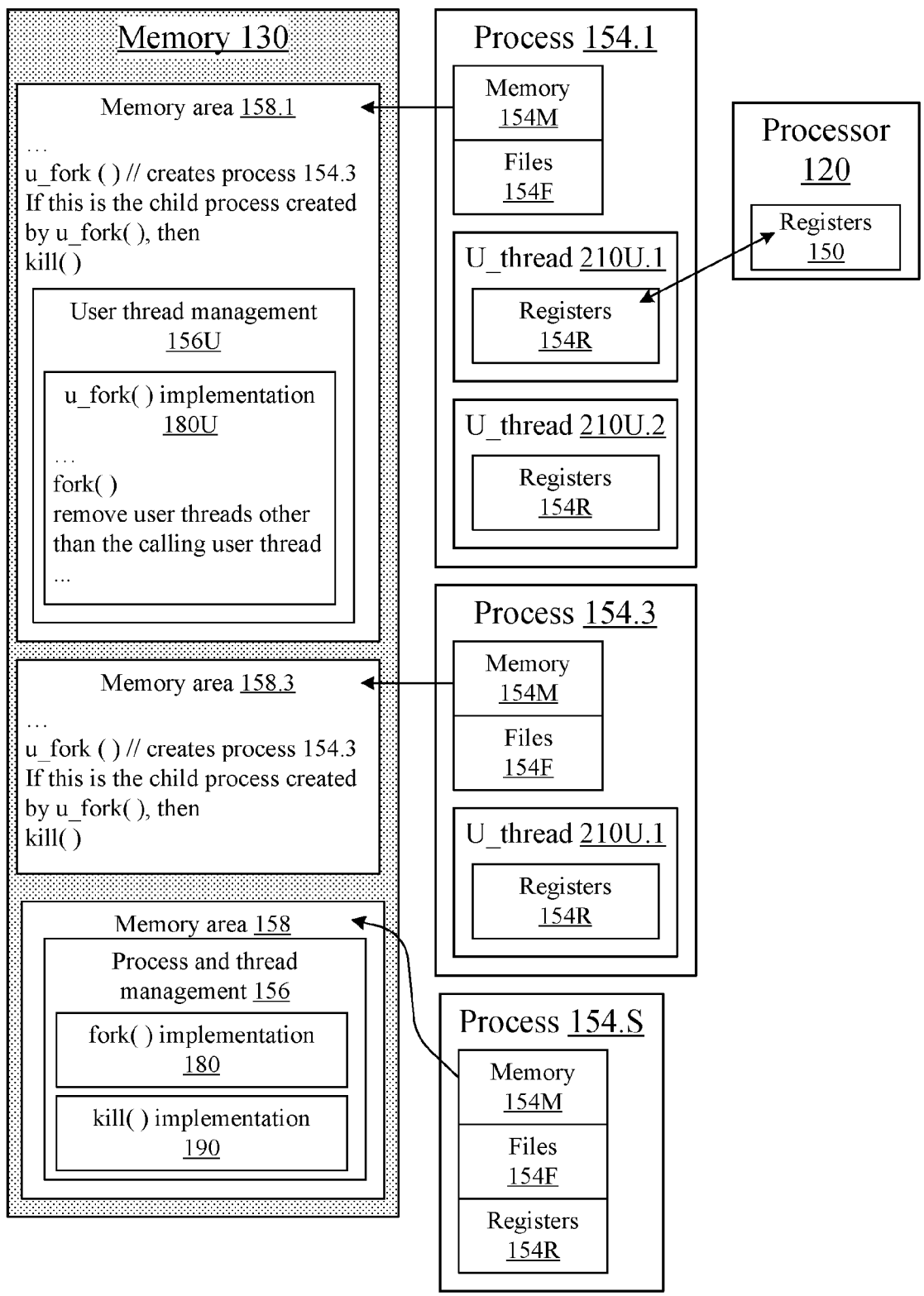

Some embodiments of the present invention take advantage of user threads 210U (FIG. 4A) to obtain a core dump with all the threads. User threads 210U are threads implemented by "user" computer programs, i.e. computer programs other than the operating system. User threads 210U are managed by the user processes 154. FIG. 4A illustrates user thread management module 156U in memory area 138.1 of process 154.1. User threads 210U can be implemented regardless of whether or not the operating system provides thread management of FIG. 3. The threads 210 of FIG. 3 are sometimes called "kernel" threads. For example, the operating system NetBSD 5.1 provides for kernel threads as described above in connection with FIG. 3, but also allows user thread implementation as in FIG. 4A. In some embodiments, the module 156U is part of a library linked with the user computer programs that wish to use user threads.

By analogy with fork( ) function 180, user thread management module 156U provides a u_fork( ) function 180U which creates a new child process with just one user thread—the thread which called u_fork( ). The remaining user threads are not reproduced in the child process in order to simplify synchronization between the child process and the parent's user threads 210U.

FIG. 4A illustrates implementation 180U of such a u_fork( ) function. The u_fork( ) functions calls fork( ) to cause the operating system's process and thread management module 156 to create a child process 154.3. The child process is a copy of the parent process 154.1, with a copy of all the user threads 210U of process 154.1.

Then the u_fork( ) function removes all the user threads 210 from the child process 154.3 except for the copy of the calling user thread 210U.1 in order to avoid problems that may arise in synchronizing the process 154.3 with the user threads 210U of the parent process 154.1.

FIGS. 5A-5E show one existing u_fork( ) implementation 180U in programming language C. In these figures, "u_fork" is shown as "fork"; see FIG. 5B. The operating system's function "fork" is shown as "_thread_sys_fork_" in FIG. 5B.

If the "thread-and-kill" method is used with u_fork instead of fork (see FIG. 4A), the resulting core dump 160 will contain only the calling user thread 210U.1. As noted above, this is unsatisfactory.

Figure 4B:
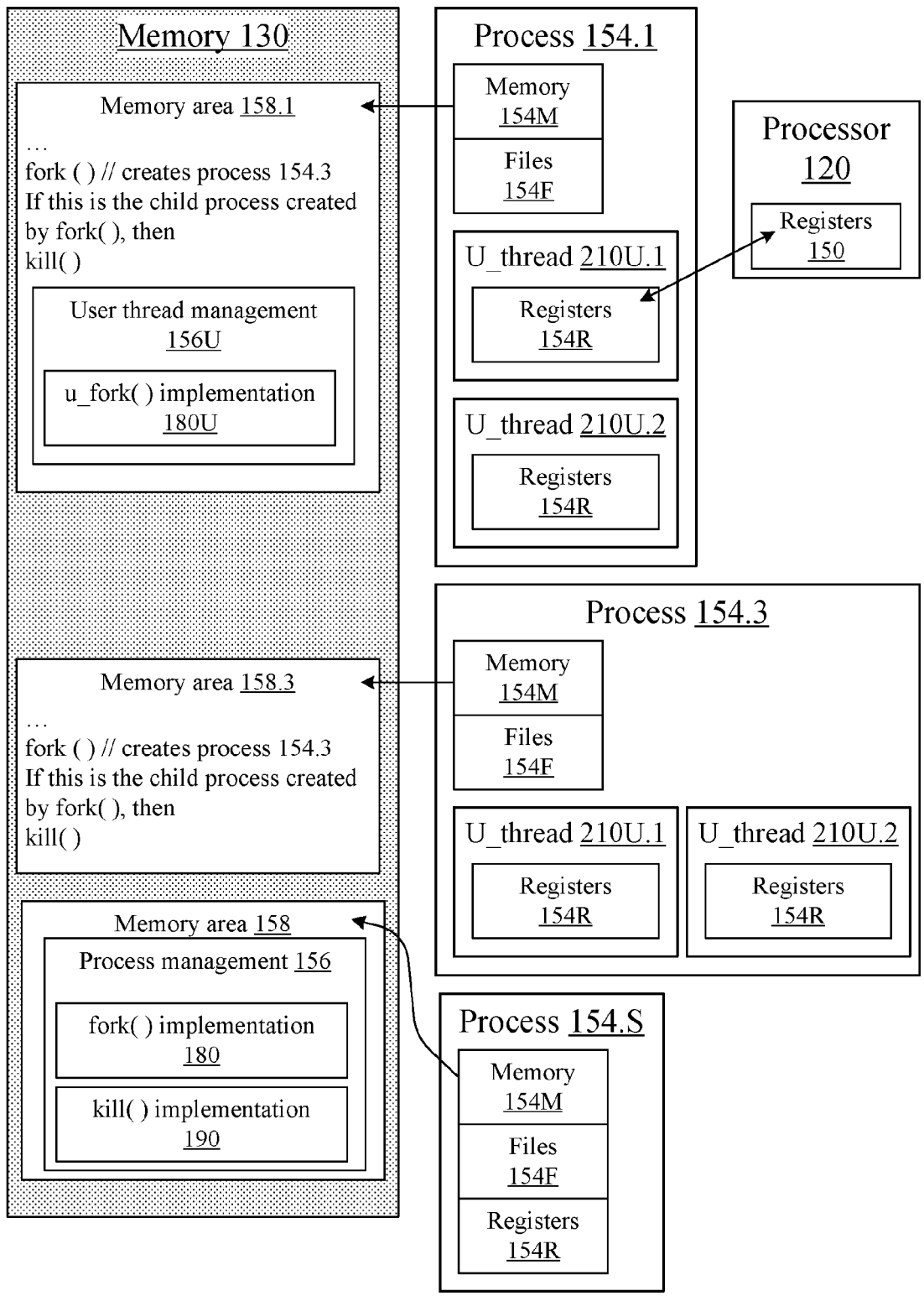

The inventor has observed that all the user threads can be presented in the core dump if the thread-and-kill method is modified to use fork instead of u_fork. This is illustrated in FIG. 4B. This method thus bypasses the fork and u_fork attempt to destroy all the threads except the calling thread.

The implementation of FIGS. 5A-5E is used in the operating system of type NetBSD 5.1.

Appendix A below, before the claims, shows one embodiment of the code of the thread-and-kill method of FIG. 4B in programming language C. The method is presented in a function "fl0livecore( )". This function can be called in response to a signal (an inter-process message) from another process, or in response to user input, or possibly in some other way. In some embodiments, after calling kill( ) this function waits for an indication that the core dump generation is finished, and returns an error code indicating whether or not the core dump was successfully obtained. In some embodiments, a separate user or kernel thread is created to call this function so that this function would not block any other user or kernel thread of the calling process 154.1. This separate thread may be given a high priority, possibly higher than any other user or kernel thread of process 154.1, but the other threads can run while this function waits for the core dump to be generated because this function calls waitpid to wait for the core dump. Not blocking other threads can be important in production environment.

The invention is not limited to the embodiments described above. In particular, the invention is not limited to any operating system, any implementation of any function, or any programming language except as specified by the appended claims. In some embodiments, the operating system is unaware of user threads. In other embodiments, the operating system is aware of user threads so that if a user thread is blocked, the operating system informs the user thread's process rather than blocking the process, to allow the user thread management module 156U to schedule another user thread or threads of for execution. In some such embodiments, the operating system does not itself schedule user threads for execution and does not keep track of particular resources (e.g. locks) held by individual user threads; such tasks are performed by user thread management module 156U of the computer program (each computer program with user threads may have its own user thread management module 156U).

The invention is not limited to any particular functions. For example, in some operating systems, the kill function can be replaced by an illegal operation that causes termination of the calling process and creation of core dump 160. The illegal operation could, for example, be an operation that accesses a memory location unavailable to the child process. Thus, if the child process executes in a virtual memory environment in which a fault is generated when the child process attempts to access a memory location outside of the child process's address space, and if the fault causes the operating system to terminate the faulting process and create a memory dump of the faulting process, then the kill function could be replaced by an instruction accessing a memory location outside of the child process's address space.

The invention comprises computer readable media (e.g. disks and other) with computer instructions to implement the methods of the present invention. Other embodiments and variations are within the scope of the invention, as defined by the appended claims.

APPENDIX A

```
/* Copyright © Dell Products L.P. 2011. All rights reserved.
*
* The f10livecore function will be invoked when SIGUSR2 is sent to the
* process or when a variable is set by attaching to the ddb thread
* (another highest priority thread is polling for this variable.)
*
* This function may also be invoked voluntarily from the code when
* a process likes to coredump itself.
*/
/* F10EXTENSIONS BEGINS */
/* Generates the coredump of the process calling this function, by
* forking and killing the child with SIGUSR2 with default action.
* Returns -1 if the live coredump is known to have failed, 0 else.
* This function is not exported in a header.
*/
int f10livecore(void);
    int
f10livecore(void)
{
        pid_t pid;
        int ret = 0, wait_ret, status;
        /* defer signals, as we don't want the child to access the
         * parent's resources, due to another thread being scheduled */
        _thread_kern_sig_defer( );
        /* create a copy of the calling process with all the user threads */
        if ((pid = _thread_sys_fork( )) == 0) {
            /* Create a coredump which will be identical to that
             * of the parent (except for SIGUSR2 disposition).
             * The default action for SIGUSR2 has been changed in
             * NetBSD kernel from SA_KILL to
             * SA_KILL|SA_CORE.
             */
            if (signal(SIGUSR2, SIG_DFL) != SIG_ERR)
                (void)kill(getpid( ), SIGUSR2);
            /* Shouldn't be reached */
            exit(-1);
        }
        /* undefer in parent */
        _thread_kern_sig_undefer( );
        if (pid > 0) {
            /* Using polling for waitpid, as blocking waitpid will only
            work
             * if SIGCHLD isn't masked for the process, and it will
            be masked
             * if the process had been fork/execve'd from a thread
             that had
             * masked SIGCHLD - a uthread wart */
            while (((wait_ret = waitpid(pid, &status,
WNOHANG|WUNTRACED)) == 0) ||
                        (wait_ret == -1 && errno == EINTR))
                    /* coredump not done yet, we take our sweet
                    time */
                    sleep(1);
            if ((wait_ret > 0 && !((WIFSIGNALED(status) &&
WCOREDUMP(status)))) ||
                        (wait_ret == -1 && errno != ECHILD)) {
                    if(wait_ret > 0)
                            /* coredump failed, possibly no memory
                            */
                            errno = ENOMEM;
                    /* else there is an unexpected error. Return -1 in
                    both cases
*/
                    ret = -1;
            }
            /* we return 0 if coredump succeeded, or if ECHILD (some
            one
             * else reaped the child, and we don't know the coredump
             * status, which we optimistically assume to be successful)
             */
        }
        else /* fork failed */
            ret = -1;
        return ret;
}
/* F10EXTENSIONS ENDS */
```

The invention claimed is:

1. A method for obtaining a memory dump for a first process executing on a computer system comprising one or more computer processors and a computer storage, the method comprising:

executing a process management program by the computer system, the process management program being operable to create a corresponding new process (child process) in response to a call to a first predefined function by another process (parent process), wherein if the parent process comprises a plurality of user threads then the child process comprises duplicates of the parent process's user threads;

executing the first process by one or more of the computer processors, wherein the first process comprises a plurality of user threads, and executing the first process comprises executing a first user thread of the first process;

wherein computer instructions associated with the first user thread comprise a call to the first predefined function which is followed by a dump-creating operation, wherein the first predefined function causes the process management program to create a second process as the corresponding child process whose code and data duplicate the first process with all the user threads of the first process, wherein the second process is to start execution from an instruction following a duplicated call to the first predefined function in the second process;

wherein in the computer instructions associated with the first user thread, the call to the first predefined function is preceded by one or more first instructions impeding access to at least some of the first process's resources by the second process;

wherein executing the first user thread comprises executing said one or more first instructions and then executing said call to the first predefined function to create the second process;

wherein executing the second process comprises executing a duplicated dump-creating operation which causes a memory dump of the second process to be created, all the user threads of the second process being presented in the memory dump of the second process;

wherein executing the duplicated dump-creating operation causes termination of the second process.

2. The method of claim 1 wherein executing the duplicated dump-creating operation in the second process is performed by a user thread which duplicates the first user thread in the first process.

3. A computer system comprising one or more processors and computer storage, the computer system being programmed to perform the method of claim 2.

4. The method of claim 1 wherein executing the duplicated dump-creation operation by the second process comprises transferring control to the operating system to create the memory dump of the second process.

5. A computer system comprising one or more processors and computer storage, the computer system being programmed to perform the method of claim 4.

6. A computer system comprising one or more processors and computer storage, the computer system being programmed to perform the method of claim 1.

7. The computer system of claim 6 wherein if the first predefined function is called by a parent process comprising a plurality of non-user threads, then the corresponding child process comprises only one non-user thread which is a duplicate of the parent process's non-user thread that called the first predefined function.

7

8. The method of claim 1 wherein if the first predefined function is called by a parent process comprising a plurality of non-user threads, then the corresponding child process comprises only one non-user thread which is a duplicate of the parent process's non-user thread that called the first predefined function.

9. A method for obtaining a memory dump for a first process executing on a computer system comprising one or more computer processors and a computer storage, the method comprising:
   executing the first process by one or more of the computer processors, wherein the first process comprises a plurality of user threads, and executing the first process comprises executing a first user thread of the first process;
   wherein computer instructions associated with the first user thread comprise a call to a first predefined function which is followed by a dump-creating operation, wherein the first predefined function causes an operating system in said computer system to create a second process whose code and data duplicate the first process with all the user threads of the first process, wherein the second process is to start execution from an instruction following a duplicated call to the first predefined function in the second process;
   wherein executing the first user thread comprises executing said call to the first predefined function to create the second process;
   wherein executing the second process comprises executing a duplicated dump-creating operation which causes a memory dump of the second process to be created, the memory dump of the second process comprising information on all the user threads of the second process and being substantially identical to the memory dump of the first process;
   wherein the computer instructions associated with the first user thread require the dump-creating operation to be performed conditionally so as not to be performed in the first process but to be performed in the second process.

10. The method of claim 9 wherein executing the duplicated dump-creating operation causes termination of the second process.

11. A computer system comprising one or more processors and computer storage, the computer system being programmed to perform the method of claim 10.

12. A computer system comprising one or more processors and computer storage, the computer system being programmed to perform the method of claim 9.

13. A non-transitory computer readable medium comprising computer code for obtaining a memory dump for a first process executing on a computer system comprising one or more computer processors and a computer storage together with a process management program, the process management program being operable to create a corresponding new process (child process) in response to a call to a first predefined function by another process (parent process), wherein if the parent process comprises a plurality of user threads then the child process comprises duplicates of the parent process's user threads;
   wherein the computer code comprises computer code for the first process to be executed by one or more of the computer processors, wherein the first process is to have a plurality of user threads comprising at least a first user thread, the computer code for the first process comprising computer code associated with the first user thread;
   wherein the computer code associated with the first user thread comprises a call to the first predefined function which is followed by a dump-creating operation, wherein the first predefined function is to cause the process management program to create a second process as the corresponding child process whose code and data duplicate the first process with all the user threads of the first process, wherein the second process is to start execution from an instruction following a duplicated call to the first predefined function in the second process;
   wherein in the computer code associated with the first user thread, the call to the first predefined function is preceded by one or more first instructions impeding access to at least some of the first process's resources by the second process;
   wherein the first user thread is to execute said one or more first instructions and then execute said call to the first predefined function to create the second process;
   wherein the second process is to execute a duplicated dump-creating operation which is to cause a memory dump of the second process to be created, all the user threads of the second process being presented in the memory dump of the first process;
   wherein executing the duplicated dump-creating operation causes termination of the second process.

14. The computer readable medium of claim 13 wherein executing the duplicated dump-creating operation in the second process is to be performed by a user thread which duplicates the first user thread in the first process.

15. The computer readable medium of claim 13 wherein executing the duplicated dump-creation operation by the second process comprises transferring control to the operating system to create the memory dump of the second process.

16. The computer readable medium of claim 13 wherein if the first predefined function is called by a parent process comprising a plurality of non-user threads, then the corresponding child process comprises only one non-user thread which is a duplicate of the parent process's non-user thread that called the first predefined function.

17. A non-transitory computer readable medium comprising computer code for obtaining a memory dump for a first process executing on a computer system comprising one or more computer processors and a computer storage;
   wherein the computer code comprises computer code for the first process to be executed by one or more of the computer processors, wherein the first process is to have a plurality of user threads comprising at least a first user thread;
   wherein computer code associated with the first user thread comprises a call to a first predefined function which is followed by a dump-creating operation, wherein the first predefined function is to cause an operating system in said computer system to create a second process whose code and data duplicate the first process with all the user threads of the first process, wherein the second process is to start execution from an instruction following a duplicated call to the first predefined function in the second process;
   wherein the first user thread is to execute said call to the first predefined function to create the second process;
   wherein the second process is to execute a duplicated dump-creating operation which is to cause a memory dump of the second process to be created, the memory dump of the second process comprising information on all the user threads of the second process and being substantially identical to the memory dump of the first process;
   wherein the computer instructions associated with the first user thread require the dump-creating operation to be performed conditionally so as not to be performed in the first process but to be performed in the second process.

18. The computer readable medium of claim 17 wherein executing the duplicated dump-creating operation causes termination of the second process.

* * * * *